US012026004B2

(12) United States Patent
Iimure et al.

(10) Patent No.: US 12,026,004 B2
(45) Date of Patent: Jul. 2, 2024

(54) INPUT DEVICE

(71) Applicant: Alps Alpine Co., Ltd., Tokyo (JP)

(72) Inventors: Satoshi Iimure, Miyagi (JP); Masaaki Takahashi, Miyagi (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/152,376

(22) Filed: Jan. 10, 2023

(65) Prior Publication Data

US 2023/0161370 A1 May 25, 2023

Related U.S. Application Data

(63) Continuation of application No. PCT/JP2021/019145, filed on May 20, 2021.

(30) Foreign Application Priority Data

Aug. 19, 2020 (JP) ................................ 2020-138794

(51) Int. Cl.
*G05G 1/02* (2006.01)
*G05G 1/04* (2006.01)
*G05G 9/047* (2006.01)

(52) U.S. Cl.
CPC ............... *G05G 1/04* (2013.01); *G05G 9/047* (2013.01); *G05G 2009/04755* (2013.01); *G05G 2700/14* (2013.01); *G05G 2700/18* (2013.01)

(58) Field of Classification Search
CPC .... H01H 25/00; H01H 25/006; H01H 25/002; G05G 1/04; G05G 1/025; G05G 9/047; G05G 2009/04755; G05G 2700/14
See application file for complete search history.

(56) References Cited

U.S. PATENT DOCUMENTS

2009/0195242 A1 8/2009 Kikuchi
2011/0204883 A1 8/2011 Konno et al.
2015/0185757 A1* 7/2015 Jantke .................. B60R 16/005
74/471 XY

FOREIGN PATENT DOCUMENTS

JP 2009-187704 A 8/2009
JP 2009-212004 A 9/2009
JP 2009212004 A * 9/2009
JP 2011-171224 A 9/2011

OTHER PUBLICATIONS

Translation of JP-2009212004-A (Year: 2009).*
International Search Report for corresponding International Application No. PCT/P2021/019145 dated Aug. 10, 2021 (2 Pages).

* cited by examiner

*Primary Examiner* — Randell J Krug
(74) *Attorney, Agent, or Firm* — Harness, Dickey & Pierce, P.L.C.

(57) ABSTRACT

An input device includes an operating body that moves through an operation performed by an operator, a movable portion that slides in accordance with movement of the operating body, a lever including a first end portion that engages with the movable portion, a rotation center, a second end portion located on an opposite side of the rotation center from the first end portion, and a magnet provided on the second end portion, where the lever rotates in accordance with sliding of the movable portion, and a magnetic sensor disposed facing the magnet. A second length from the rotation center of the lever to the magnet is greater than a first length from the rotation center to the first end portion of the lever.

5 Claims, 8 Drawing Sheets

<0.1 mm>

<0.3 mm>

<0.5 mm>

<0.9 mm>

INPUT DEVICE

CLAIM OF PRIORITY

This application is a Continuation of International Application No. PCT/JP2021/019145 filed on May 20, 2021, which claims benefit of Japanese Patent Application No. 2020-138794 filed on Aug. 19, 2020. The entire contents of each application noted above are hereby incorporated by reference.

BACKGROUND OF THE INVENTION

1. Field of the Invention

The present invention relates to an input device.

2. Description of the Related Art

An input device has been developed that when an operating unit is moved in a lateral direction, a drive unit that slides in the lateral direction along with the operating unit engages with the upper end of the tilting body to rotate the tilting body, and the movement of a magnet on the lower end of the tilting body in the rotation direction is detected by a magnetic sensor (refer to, for example, Japanese Unexamined Patent Application Publication No. 2009-212004).

In existing input devices, because the length from the rotation center of the tilting body to the operating unit is the same as the length from the rotation center to the magnet, it is difficult to detect minute movements of the operating body in the lateral direction.

SUMMARY OF THE INVENTION

Accordingly, the present invention provides an input device capable of reliably detecting fine operation in the lateral direction of an operating body.

According to an embodiment of the present invention, an input device includes an operating body configured to move through an operation performed by an operator, a movable portion configured to slide in accordance with movement of the operating body, a lever including a first end portion that engages with the movable portion, a rotation center, a second end portion located on an opposite side of the rotation center from the first end portion, and a magnet provided on the second end portion, where the lever rotates in accordance with sliding of the movable portion, and a magnetic sensor disposed facing the magnet. A second length from the rotation center of the lever to the magnet is greater than a first length from the rotation center to the first end portion of the lever.

DESCRIPTION OF THE PREFERRED EMBODIMENTS

Embodiments to which an input device according to the present invention is applied are described below.

EMBODIMENTS

Figure 1:
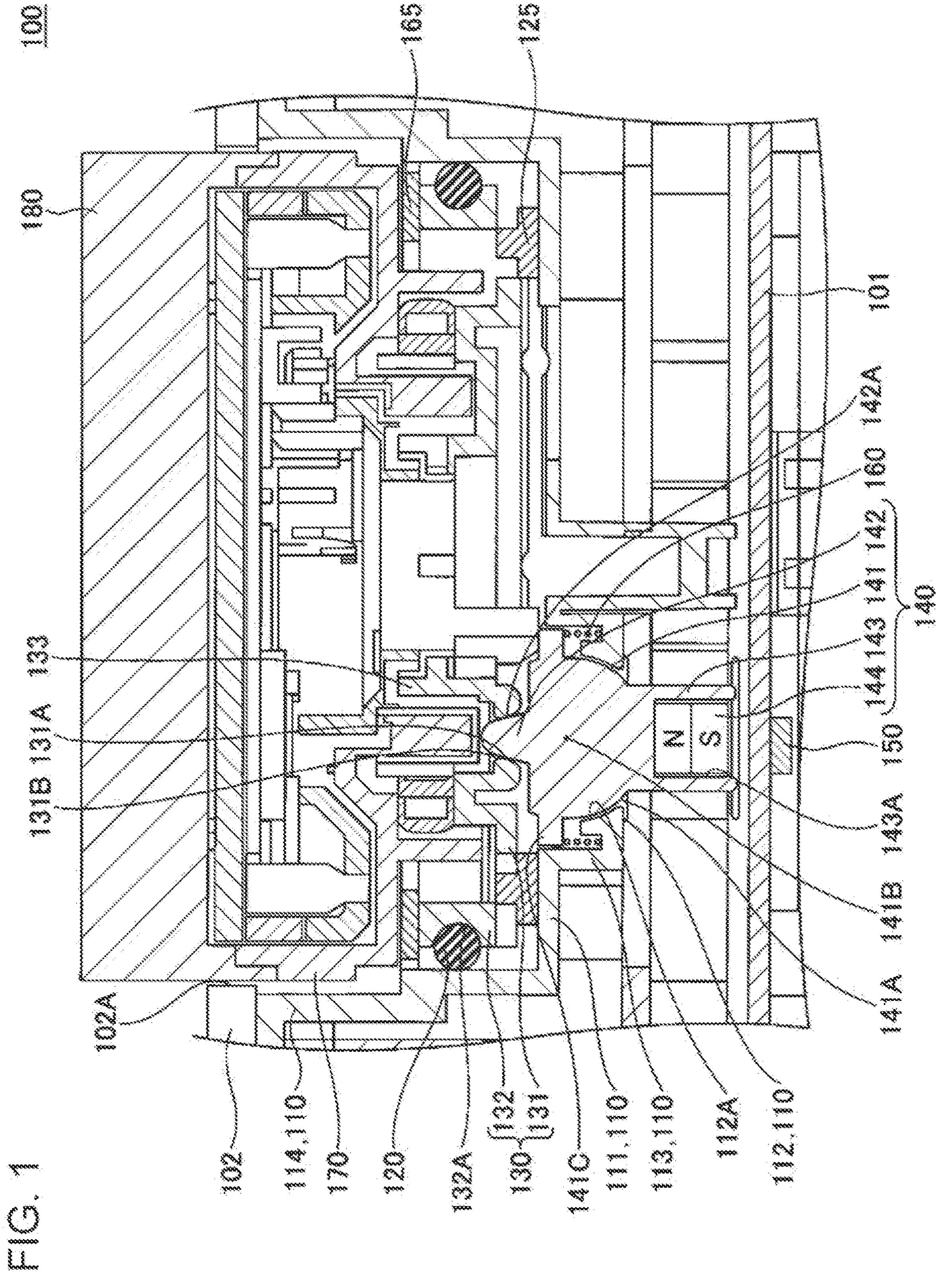
FIG. 1 illustrates the cross-sectional structure of an input device.
Figure 2:
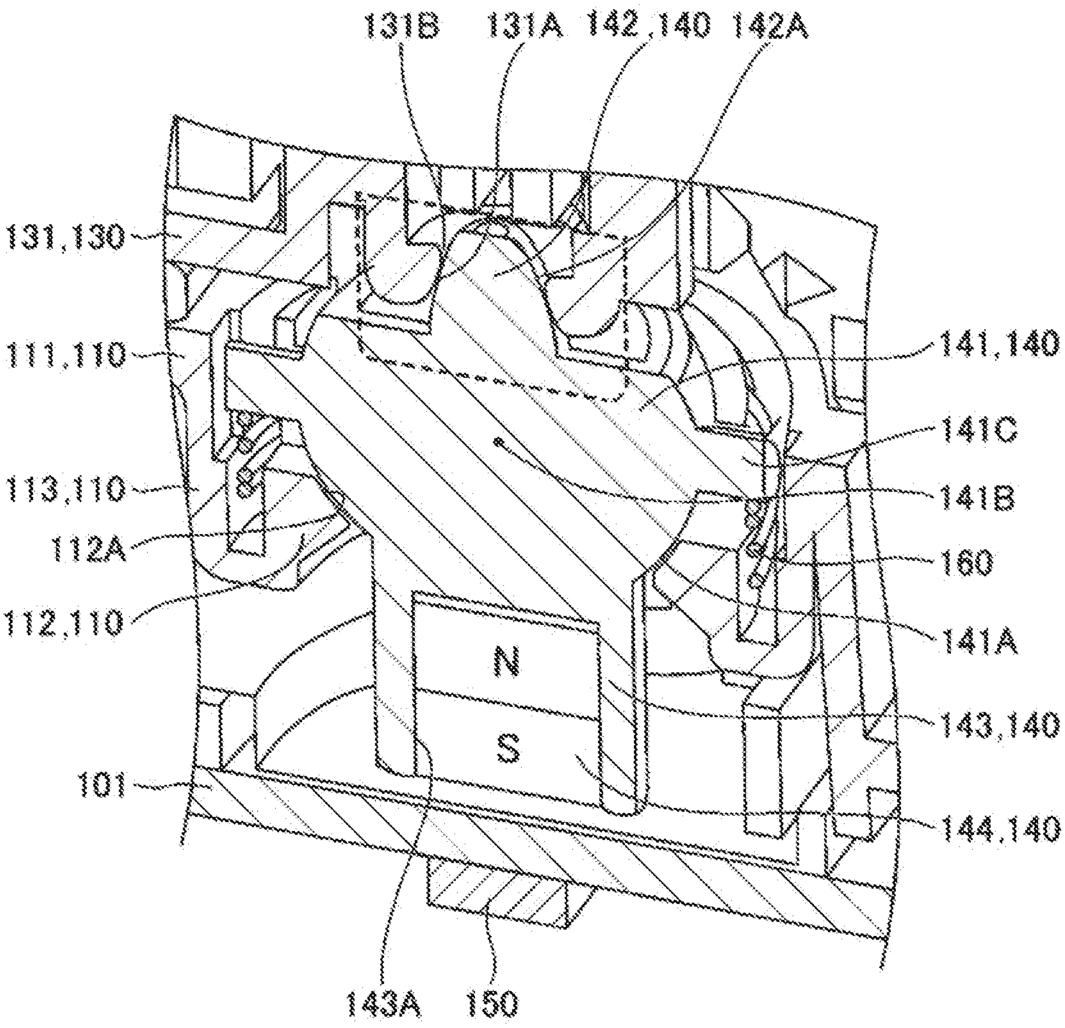
FIG. 2 is an enlarged view of a portion of the input device illustrated in FIG. 1.
Figure 3:
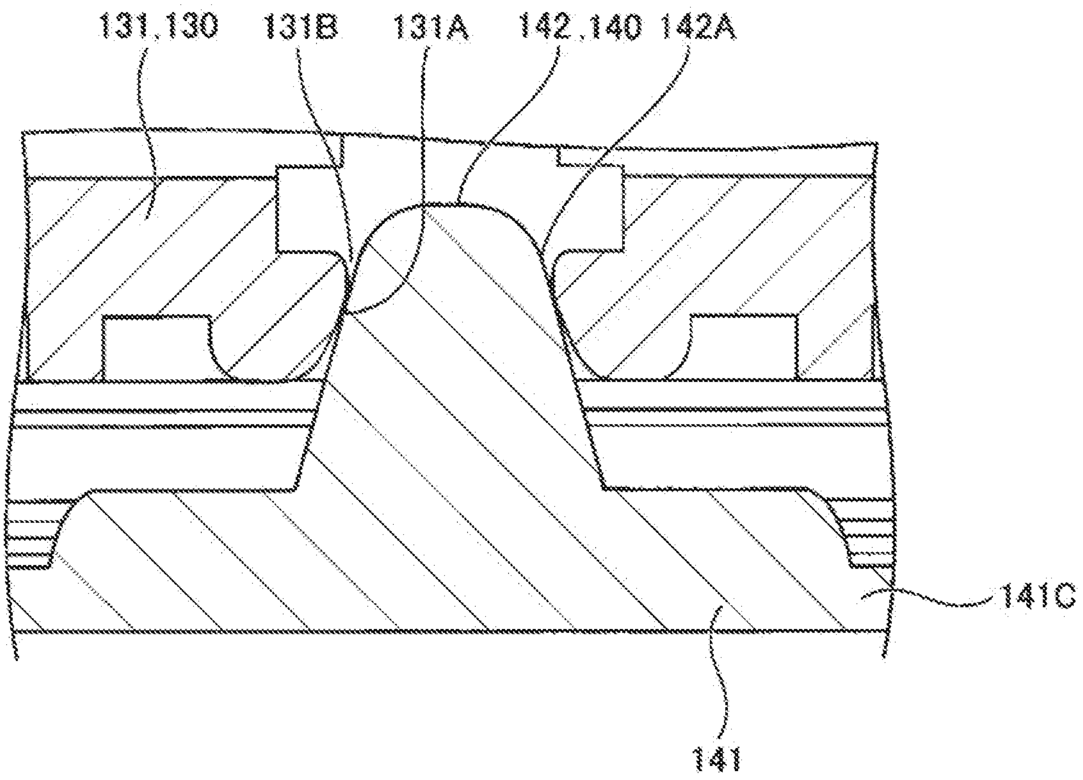
FIG. 3 is an enlarged view of a portion of the input device illustrated in FIG. 2.

FIG. 1 illustrates the cross-sectional structure of an input device 100. FIG. 2 is an enlarged view of a portion of the input device 100 illustrated in FIG. 1. FIG. 3 is a further enlarged view of a portion of the input device 100 illustrated in FIG. 2. FIG. 3 illustrates an enlarged view of the portion enclosed by a dashed square in FIG. 2. While the description below is made with reference to the up-down direction and the left-right direction in FIG. 1, the directions do not represent a universal vertical relationship. In addition, the up-down direction is the longitudinal direction, and the left-right direction is the lateral direction. Moreover, the term "plan view" refers to a view seen from above.

The input device 100 includes a frame 110, an O-ring 120, a slider base 125, a movable portion 130, a lever 140, a magnetic sensor 150, a coil spring 160, a holder 165, a holding portion 170, and a knob 180. Furthermore, the input device 100 includes a substrate 101 and a cover 102. The substrate 101 is, for example, a plate-shaped substrate made of resin and is located in the lower section of the input device 100. The cover 102 is made of, for example, resin and is a plate-shaped member that covers a portion of the input device 100 other than the knob 180. Although FIG. 1 also illustrates constituent elements other than those described herein, description of the constituent elements is omitted. The input device 100 is a device including the knob 180 that can be moved in any left-right direction throughout 360 degrees by an operation performed by an operator. The knob 180 is, for example, a cylindrical member. The stroke of the knob 180 is set only to the extent that the O-ring 120 provided around the knob 180 serving as a stopper is squeezed in accordance with the movement of the knob 180, so that the stroke is extremely small. FIG. 1 illustrates the initial positions of the elements when the knob 180 is not operated and, thus, does not move.

The frame 110 includes a base portion 111, a support portion 112, a groove portion 113, and a fixing portion 114. For example, the outer shape of the frame 110 in plan view is circular, and the outer shape of the base portion 111 in plan view is also circular. The base portion 111 is a portion that extends in the planar direction below the movable portion 130 (described below), and the support portion 112 is provided to the left of the center of the knob 180 in the lateral direction. The fixing portion 114 extending upward is provided at the outer end portion of the base portion 111.

The support portion 112 supports the lever 140 that rotates as the movable portion 130 slides while being in rotatable contact with the lever 140. The support portion 112 extends below the base portion 111 and is provided on the inner side of the groove portion 113. The support portion 112 is connected to the base portion 111 via the groove portion 113. The support portion 112 has an arched surface 112A that supports a spherical surface 141A of a base portion 141 of the lever 140. Note that the spherical surface 141A is an example of a curved surface. The arched surface 112A may be provided continuously throughout 360 degrees so as to surround the base portion 141 of the lever 140 in plan view. However, according to the present embodiment, the arched surface 112A is provided at every predetermined angle interval, and the shape of the arched surface 112A is matched with the shape of the spherical surface 141A of the base portion 141. In this way, the support portion 112 holds the spherical surface 141A of the lever 140 with the entire arched surface 112A so that the spherical surface 141A of the lever 140 is rotatable in any direction around 360 degrees.

The groove portion 113 extends under the base portion 111 and is an annular groove in plan view. The bottom surface of the groove portion 113 is connected to the support portion 112 located inwardly in the radial direction. The coil spring 160 is provided inside of the groove portion 113, and the lower end of the coil spring 160 is in contact with the bottom surface of the groove portion 113. Note that the coil spring 160 is an example of an elastic member.

The fixing portion 114 is connected to the outer end of the base portion 111 and extends upward. The fixing portion 114 is, for example, a cylindrical portion, and the cover 102 is fixed to the upper end of the fixing portion 114. Herein, the movement of the movable portion 130 and the knob 180 relative to the frame 110 and the rotation of the lever 140 are described assuming that the frame 110 is fixed inside of the input device 100. However, for example, the frame 110 may be movable and vibratable relative to, for example, the substrate 101 together with the cover 102. Even in this case, the relative positional relationship between the movement of the movable portion 130, the knob 180, and the like relative to the frame 110 and the rotation of the lever 140 remain unchanged.

The O-ring 120 is, for example, an annular member made of rubber. In FIG. 1, a circular cross-section of the O-ring 120 is illustrated. The O-ring 120 is fitted into and fixed to a recess 132A provided in the outer peripheral surface of a cylindrical wall portion 132 of the movable portion 130 that slides as the knob 180 moves. The outer peripheral surface of the O-ring 120 is in contact with the inner peripheral surface of the fixing portion 114 of the frame 110, and the knob 180 is held at the initial position without backlash. When the knob 180 is operated to move in the lateral direction, a portion of the O-ring 120 on the movement direction side is pressed and deformed so as to be squeezed. Thus, the movable portion 130 is moved in the lateral direction relative to the frame 110. The amount of deformation due to the squeezing of the O-ring 120 is the lateral stroke of the movable portion 130 and the knob 180.

The slider base 125 is a member provided between the upper surface of the base portion 111 of the frame 110 and the lower surface of a base portion 131 of the movable portion 130. The slider base 125 has an annular shape in plan view. The slider base 125 enables the movable portion 130 to move laterally relative to the frame 110. The slider base 125 is made of metal or resin, for example.

The movable portion 130 includes the base portion 131 and the wall portion 132. For example, the outer shape of the movable portion 130 in plan view is circular, and the base portion 131 is a portion located in the center of the movable portion 130 in plan view. The base portion 131 has a cam surface 131A and an opening 131B provided in a portion located above the lever 140.

The cam surface 131A is provided along the inner surface of the circular opening 131B so as to surround the opening 131B. That is, the cam surface 131A is formed such that the inner peripheral surface of the base portion 131 facing the opening 131B and the upper and lower surfaces of the base portion 131 are continuously connected at a portion around the opening 131B and are curved. The cam surface 131A serves as an engaging portion with which a conical portion 142 of the lever 140 engages. The cam surface 131A has a shape that enables a side surface 142A of the conical portion 142 to remain in contact with the cam surface 131A when the lever 140 rotates about the base portion 141 of the lever 140 so that the conical portion 142 tilts. The cam surface 131A only needs to be able to remain in contact with the side surface 142A of the conical portion 142 when the conical portion 142 is tilted. For this reason, the shape is not limited to a shape that continuously curves from the upper end to the lower end of the opening 131B, and any section of the shape from the upper end to the lower end may be linear.

The wall portion 132 is, for example, a cylindrical portion and is a wall-shaped portion extending upward from the base portion 131 on the outermost side of the movable portion 130 in plan view. As described above, the wall portion 132 has the recess 132A on the outer peripheral surface thereof. The recess 132A is provided in the outer peripheral surface of the cylindrical wall portion 132 so as to extend in the circumferential direction all the way around the wall portion 132. The outer diameter of the portion of the outer peripheral surface of the wall portion 132 other than the recess 132A is greater than the inner diameter of the O-ring 120, and the outer diameter of the recess 132A is slightly greater than the inner diameter of the O-ring 120. Thus, the O-ring 120 is fitted into and fixed to the recess 132A while being slightly stretched.

The lever 140 includes the base portion 141, the conical portion 142, a leg portion 143, and a magnet 144. The base portion 141 is a portion that is located in the center of the lever 140 in the up-down direction and has the spherical surface 141A, a rotation center 141B, and arm portions 141C. The base portion 141 has a circular shape centered at the rotation center 141B in plan view and has a shape obtained by cutting a spherical shape formed of a spherical surface 141A, which has a certain radius from the rotation center 141B, at a point near the upper end so as to have an upper end flat plane. A conical portion 142 is connected to the upper end flat plane of the base portion 141 above the rotation center 141B, and the leg portion 143 is connected to the lower end of the base portion 141 below the rotation center 141B.

The arm portions 141C are four rod-shaped protrusions provided on the outer side of the spherical surface 141A of the base portion 141 at intervals of 90 degrees in plan view. That is, the four arm portions 141C are provided at equal intervals in plan view and protrude in the horizontal direction at substantially the same height as the rotation center 141B of the spherical surface 141A. The lower surfaces of the arm portions 141C are in contact with the upper end of the coil spring 160. In the lever 140, the conical portion 142 is in contact with the cam surface 131A of the movable portion 130, and the arm portions 141C are urged from below toward the movable portion located above the arm portions 141C by the coil spring 160. At the initial position illustrated in FIG. 1, the spherical surface 141A is set so as to be slightly separated from the arched surface 112A of the frame 110.

The conical portion 142 is continuously provided on the upper end flat surface of the base portion 141 and is located as the upper end portion of the lever 140. The upper end portion of the lever 140 is an example of a first end portion. The conical portion 142 is continuously provided above the rotation center 141B of the base portion 141 in plan view. According to the present embodiment, the entire upper end portion of the lever 140 is the conical portion 142. However, the present invention is not limited thereto, and part of the upper end portion may be the conical portion.

The conical portion 142 has a shape obtained by rounding off the upper end of a circular cone, and the side surface 142A of the conical portion 142 is in contact with the cam surface 131A. Since the lever 140 is urged upward toward the movable portion by the coil spring 160, the conical portion 142 is pressed against the cam surface 131A.

The leg portion 143 is a portion that extends downward from the base portion 141 and is located as a lower end portion of the lever 140. The lower end portion of the lever 140 is an example of a second end portion and is on the opposite side of the rotation center 141B from the first end portion. A space is provided between the lower end of the leg portion 143 and the upper surface of the substrate 101. This is to prevent the lower end of the leg portion 143 from contacting the upper surface of the substrate 101, since the lever 140 rotates. An outer shape of the leg portion 143 is, for example, cylindrical. The leg portion 143 has a recess 143A that is concave upward from the bottom surface. The magnet 144 is provided in the recess 143A.

The magnet 144 is fixed inside the recess 143A of the leg portion 143 by bonding or the like. The magnet 144 is a permanent magnet having an N pole and an S pole. For example, the magnet 144 is disposed such that the N pole is located on the upper side, and the S pole is located on the lower side. The magnet 144 is provided to detect rotation of lever 140 by using magnetic sensor 150.

In the lever 140 having the above-described structure, the longitudinal length from the rotation center 141B to the lower end of the magnet 144 is set to a value greater than the longitudinal length from the rotation center 141B to a part of the conical portion 142 that contacts the cam surface 131A. For example, the longitudinal length from the rotation center 141B to the lower end of the magnet 144 is set to about twice the longitudinal length from the rotation center 141B to the part of the conical portion 142 that contacts the cam surface 131A. The longitudinal length from the rotation center 141B to the part of the conical portion 142 that contacts the cam surface 131A is an example of a first length, and the length from the rotation center 141B to the lower end of the magnet 144 that faces the magnetic sensor 150 is an example of a second length.

The lever 140 is a member that converts lateral movement of the knob 180 into rotational movement. Lateral movement of knob 180 is transmitted to the movable portion 130 via the holding portion 170. When the movable portion 130 is slid in the lateral direction, the conical portion 142 in contact with the cam surface 131A moves in the lateral direction, causing the lever 140 to rotate about the rotation center 141B. Thus, the magnet 144 rotates about the rotation center 141B. At this time, the lever 140 operates as a lever having the conical portion 142 serving as the point of effort, the spherical surface 141A serving as the fulcrum, and the magnet 144 serving as the point of load. For this reason, if the length between the fulcrum and the point of load is set to a value greater than the length between the fulcrum and the point of effort, the lever 140 can be used as an amplifying device that amplifies the amount of movement of the point of load. That is, by amplifying the amount of movement of the magnet 144 at the point of load, the amount of change in the magnetic flux due to the movement of the magnet 144 can be amplified. If the amount of change in magnetic flux can be amplified, the magnetic sensor 150 can reliably detect a slight amount of movement of the knob 180. The lever 140 has the above-described configuration to amplify a minute lateral movement of the conical portion 142 for detection by the magnetic sensor 150.

For example, the magnetic sensor 150 is fixed to the lower surface of the substrate 101. The magnetic sensor 150 is disposed to face the magnet 144 with the substrate 101 therebetween and detects a change in the magnetic flux that has passed through the substrate 101 when the lever 140 rotates about the rotation center 141B and the magnet 144 moves. By detecting the amount of rotation of the magnet 144 using the magnetic sensor 150, a slight amount of operation of the knob 180 can be detected.

The coil spring 160 is provided inside the groove portion 113 of the frame 110. As illustrated in FIG. 1, when the lower end of the coil spring 160 is in contact with the bottom of the groove portion 113 and the upper end of the coil spring 160 is in contact with the lower surfaces of the four arm portions 141C of the lever 140, the coil spring 160 is compressed to a length less than its natural length. The coil spring 160 urges the conical portion 142 of the lever 140 toward the cam surface 131A of the movable portion 130.

The holder 165 is a member that is annular in plan view and is in slidable contact with the upper surface of the wall portion 132 of the movable portion 130 provided on the base portion 111 of the frame 110 via the slider base 125. The holder 165 is made of, for example, metal and is fixed to the fixing portion 114 of the frame 110. Since the upper surface of the wall portion 132 of the movable portion 130 is slidably pressed by the holder 165, the slider base 125 and the movable portion 130 are laterally movable between the base portion 111 of the frame 110 and the lower surface of the holder 165 without shifting their positions in the up-down direction.

The holding portion 170 has a central part that engages with a central part 133 of the movable portion 130 and holds the knob 180. The holding portion 170 is a member that transmits lateral movement of the knob 180 to the movable portion 130.

The knob 180 is an example of an operating body that is moved in the lateral direction by an operation performed by an operator. The knob 180 is a cylindrical member. The shape of the knob is not limited to a cylindrical shape and may have any shape. The knob 180 is exposed to the outside of the cover 102 through an opening 102A of the cover 102.

The operation performed by the lever 140 of the input device 100 is described below with reference to FIGS. 4A to 6. FIGS. 4A to 6 illustrate the operation performed by the input device 100. FIGS. 4A, 4B, 5A, 5B, and 6 illustrate the operation performed by the lever 140 when the knob 180 (refer to FIG. 1) is gradually pushed to the right from the initial position illustrated in FIG. 1. More specifically, FIGS. 4A, 4B, 5A, 5B, and 6 illustrate the operation statuses of the lever 140 when the knob 180 is moved right from the initial position by 0.1 mm, 0.3 mm, 0.5 mm, 0.7 mm, and 0.9 mm, respectively.

In addition, FIGS. 4A, 4B, 5A, 5B, and 6 illustrate the configurations in which part of the upper end side of the cam surface 131A is a linear section.

Furthermore, when the knob 180 is moved laterally, the movable portion 130 also moves laterally via the holding portion 170 by the same amount. Therefore, hereinafter, the operation performed by the lever 140 caused by lateral movement of the knob 180 is described with reference to the operation performed by the lever 140 caused by the lateral movement of the movable portion 130.

Figure 4A:
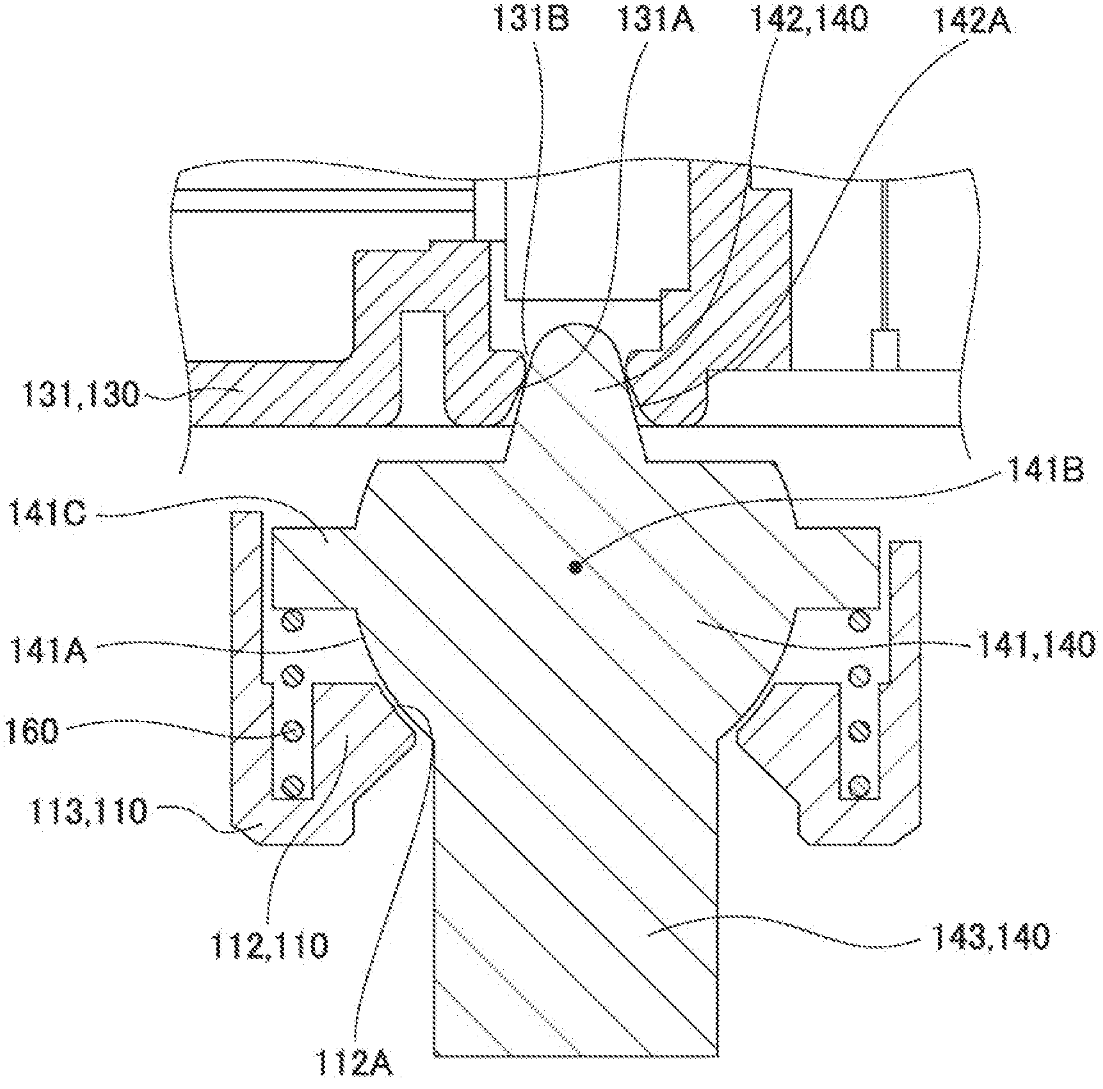
FIG. 4A illustrates an operation performed by the input device.

As illustrated in FIG. 4A, when the movable portion 130 moves right from the initial position by 0.1 mm, the left side of the side surface 142A of the conical portion 142 is pressed by the cam surface 131A, and the conical portion 142 is shifted from the position at which the conical portion 142 is initially in contact with the cam surface 131A (refer to FIGS. 1 and 2). More specifically, the position where the left side of the side surface 142A is in contact with the cam surface 131A shifts downward of the conical portion 142, and the position where the right side of the side surface 142A is in contact with the cam surface 131A shifts upward of the conical portion 142. As a result, the lever 140 as a whole moves slightly downward from the initial position and slightly rotates clockwise about the rotation center 141B. At this time, the spherical surface 141A of the lever 140 and the arched surface 112A of the support portion 112 are slightly separated. By providing this gap, dimensional variations and accumulated tolerances in the manufacture of parts can be adjusted, which enables the lever 140 to rotate smoothly.

Figure 4B:
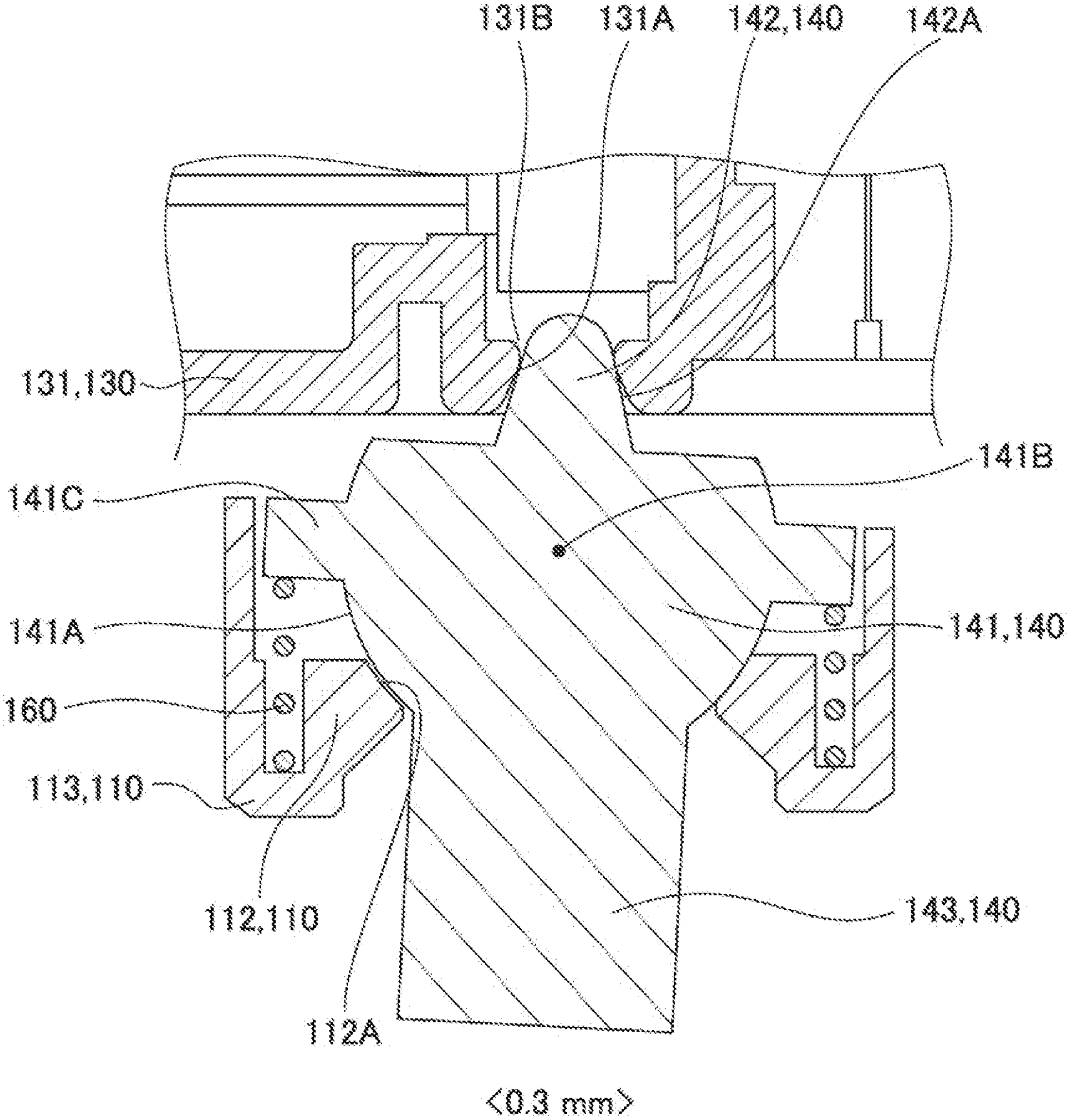
FIG. 4B illustrates an operation performed by the input device.

As illustrated in FIG. 4B, when the movable portion 130 moves right from the initial position by 0.3 mm, the left side of the side surface 142A of the conical portion 142 is further pressed by the cam surface 131A, and the position where the conical portion 142 is in contact with the cam surface 131A in FIG. 4A is shifted. More specifically, the position where the left side of the side surface 142A is in contact with the cam surface 131A is shifted further downward of the conical portion 142, and the position where the right side of the side surface 142A is in contact with the cam surface 131A is shifted further upward of the conical portion 142. As a result, the lever 140 as a whole moves further downward as compared with in FIG. 4A, and the spherical surface 141A of the lever 140 is in contact with the arched surface 112A of the support portion 112. Thus, the lever 140 rotates clockwise about the rotation center 141B with the spherical surface 141A of the lever 140 being in close contact with the arched surface 112A of the support portion 112 at least during rotation.

Figure 5A:
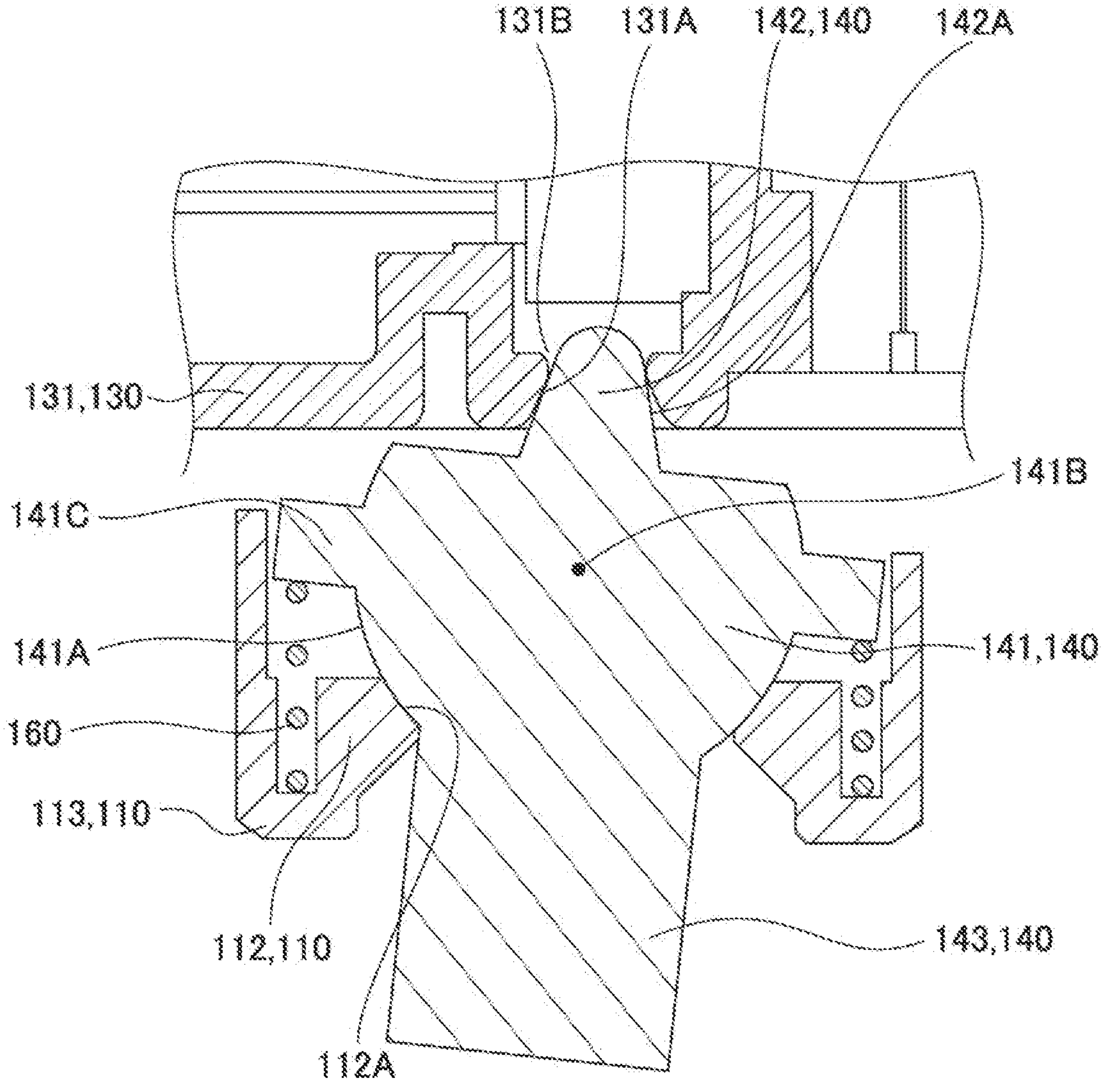
FIG. 5A illustrates an operation performed by the input device.

As illustrated in FIG. 5A, when the movable portion 130 moves right from the initial position by 0.5 mm, the left side of the side surface 142A of the conical portion 142 is further pressed by the cam surface 131A, and the position where the conical portion 142 is in contact with the cam surface 131A in FIG. 4B is shifted. More specifically, the position where the left side of the side surface 142A is in contact with the cam surface 131A is shifted further downward of the conical portion 142, and the position where the right side of the side surface 142A is in contact with the cam surface 131A is shifted further upward of the conical portion 142. As a result, since the spherical surface 141A of the lever 140 is in close contact with the arched surface 112A of the support portion 112, the lever 140 further rotates clockwise about the rotation center 141B while maintaining its position in the up-down direction substantially the same as in FIG. 4B. At this time, the spherical surface 141A of the lever 140 rotates clockwise along the arched surface 112A of the support portion 112, as compared with the position in FIG. 4B. Note that the situation where as illustrated in FIG. 5A, the spherical surface 141A of the lever 140 is in close contact with the arched surface 112A of the support portion 112 is the same as the situation illustrated in FIG. 4B, so that the distance between the rotation center 141B and the magnetic sensor 150 is the same as in FIG. 4B. Thus, in either situation, the distance between the rotation center 141B and the magnetic sensor 150 remains unchanged.

Figure 5B:
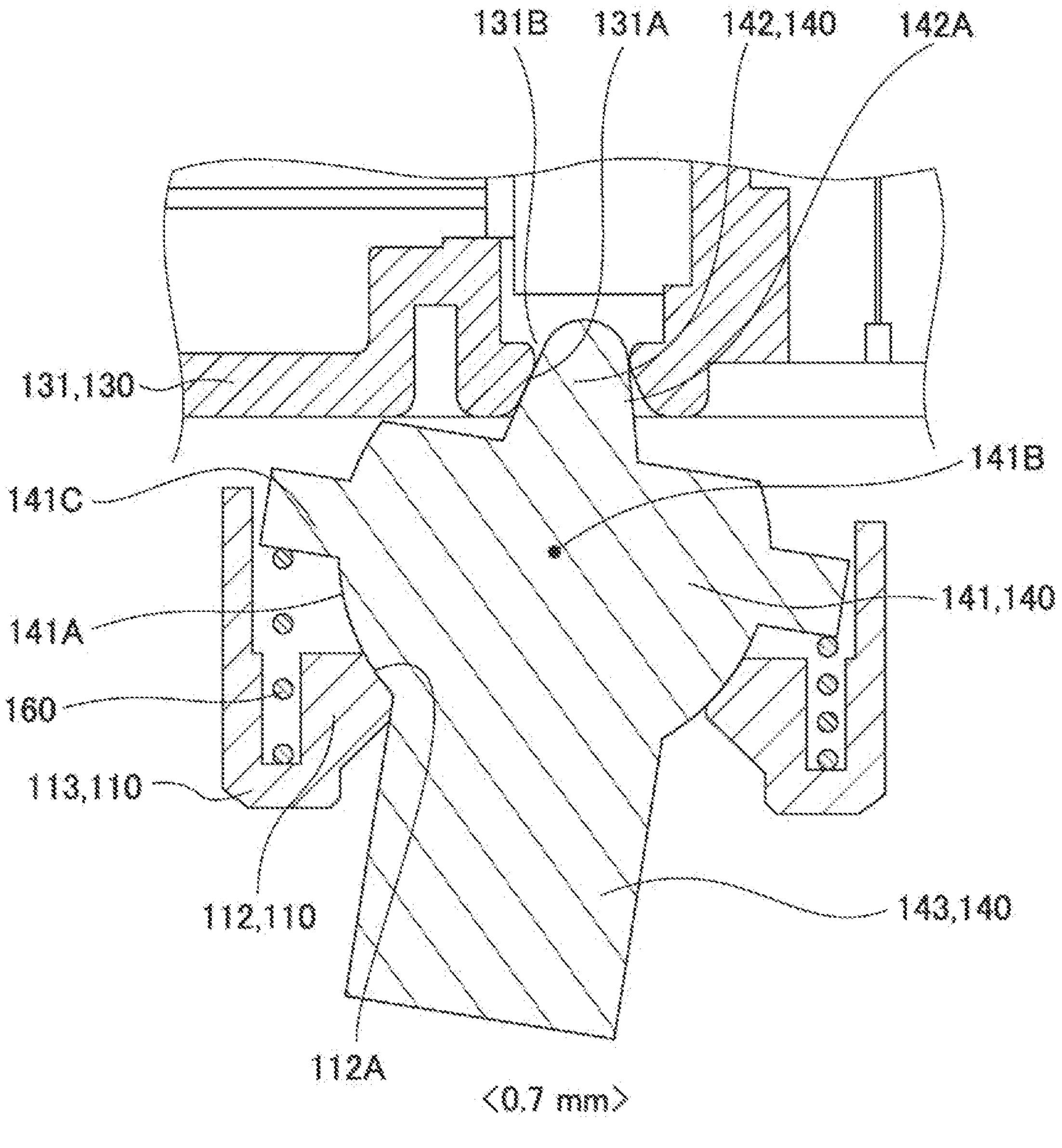
FIG. 5B illustrates an operation performed by the input device.

As illustrated in FIG. 5B, when the movable portion 130 moves right from the initial position by 0.7 mm, the left side of the side surface 142A of the conical portion 142 is further pressed by the cam surface 131A, and the position where the conical portion 142 is in contact with the cam surface 131A in FIG. 5A is shifted. More specifically, the position where the left side of the side surface 142A is in contact with the cam surface 131A is shifted further downward of the conical portion 142, and the position where the right side of the side surface 142A is in contact with the cam surface 131A is shifted further upward of the conical portion 142. As a result, since the spherical surface 141A of the lever 140 is in close contact with the arched surface 112A of the support portion 112, the position of the lever 140 in the up-down direction is substantially the same as in FIG. 5A. However, the lever 140 further rotates clockwise about the rotation center 141B. At this time, the spherical surface 141A of the lever 140 rotates clockwise along the arched surface 112A of the support portion 112 as compared to in FIG. 5A. Note that the situation where, as illustrated in FIG. 5B, the spherical surface 141A of the lever 140 is in close contact with the arched surface 112A of the support portion 112 is the same as the situation illustrated in FIG. 4B, so that the distance between the rotation center 141B and the magnetic sensor 150 is the same as in FIG. 4B. Thus, the distance between the rotation center 141B and the magnetic sensor 150 remains unchanged.

Figure 6:
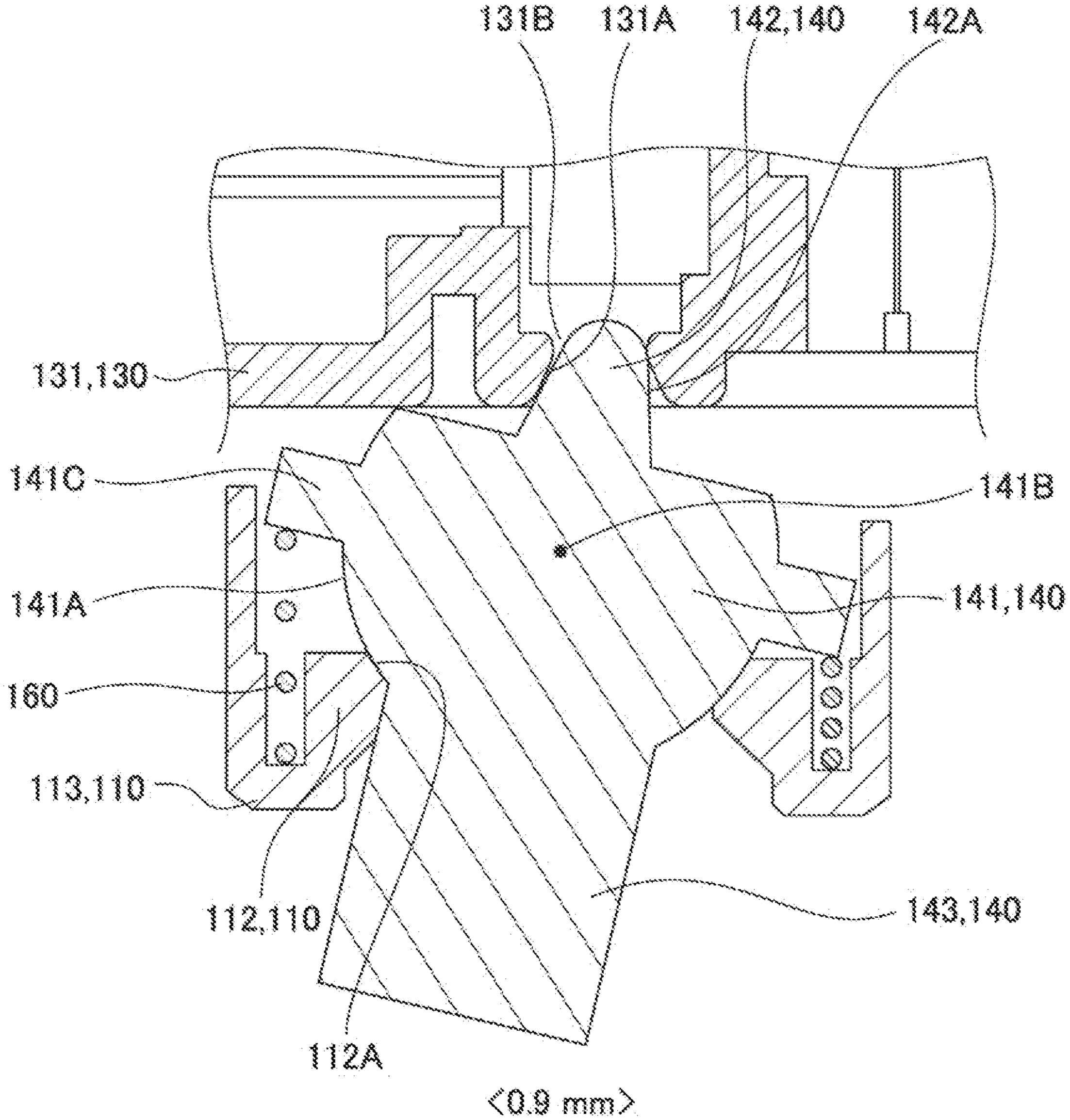
FIG. 6 illustrates an operation performed by the input device.

As illustrated in FIG. 6, when the movable portion 130 moves right from the initial position by 0.9 mm, the left side of the side surface 142A of the conical portion 142 is further pressed by the cam surface 131A, and the position where the conical portion 142 is in contact with the cam surface 131A in FIG. 5B is shifted. More specifically, the position where the left side of the side surface 142A is in contact with the cam surface 131A is shifted further downward of the conical portion 142, and the position where the right side of the side surface 142A is in contact with the cam surface 131A is shifted further upward of the conical portion 142. In FIG. 6, since the spherical surface 141A of the lever 140 is in close contact with the arched surface 112A of the support portion 112, the position of the lever 140 in the up-down direction is substantially the same as compared with in FIG. 5B. However, the lever 140 is further rotated clockwise about the rotation center 141B. At this time, the spherical surface 141A of the lever 140 rotates clockwise along the arched surface 112A of the support portion 112 as compared with in FIG. 5B. Note that the situation where the spherical surface 141A of the lever 140 is in close contact with the arched surface 112A of the support portion 112 is the same as the situation illustrated in FIG. 4B. Thus, the distance between the rotation center 141B and the magnetic sensor 150 is the same as in FIG. 4B, and the distance between the rotation center 141B and the magnetic sensor 150 remains unchanged.

In the situation illustrated in FIG. 6, the amount of movement of the knob 180 reaches the maximum stroke of the knob 180, which is the situation where the O-ring 120 is pressed by the movable portion 130 and is deformed to the elastic limit. Even in this situation, the right arm portion 141C moves until just before contacting the upper end of the support portion 112, and the left side of a flat portion moves until just before contacting the lower surface of the movable portion 130. However, the arm portion 141C and the flat portion are configured so as not to contact the support portion 112 and the movable portion 130, respectively, even when the maximum stroke is reached. As a result, even when the maximum stroke is reached, the knob 180 is provided with only elastic touch feeling due to the elasticity of the O-ring 120 serving as the stopper. This is because if the arm portion 141C or the flat portion is brought into contact with the support portion 112 or the movable portion 130, an operator feels stronger resistive forces on the knob 180 during operation, and abnormal noise is generated.

As described above, the longitudinal length of the lever 140 from the rotation center 141B to the lower end of the magnet 144 is greater than the longitudinal length of the lever 140 from the rotation center 141B to the portion of the conical portion 142 that contacts the cam surface 131A. Consequently, even if the amount of lateral movement of the knob 180 is slight, the amount of movement of the magnet 144 can be amplified, and the amount of change in magnetic flux can be increased. Therefore, even if the amount of lateral movement of the knob 180 is slight, a change in magnetic flux can be detected by the magnetic sensor 150.

As a result, it is possible to provide the input device 100 capable of reliably detecting minute manipulations of the knob 180 in the lateral direction. Furthermore, since the lever 140 has the spherical surface 141A, and the spherical surface 141A is rotatably supported by the arched surface 112A of the support portion 112, the lever 140 can be supported in a rotatable manner in multiple directions with a simplified structure.

In addition, the movable portion 130 has a cam surface 131A that is in contact with the conical portion 142 of the lever 140, and the conical portion 142 is urged against the cam surface 131A by the biasing force of the coil spring 160. By pressing the conical portion 142 against the cam surface 131A, the rotation operation performed by the lever 140 can be stabilized.

In addition, since the lever 140 has the conical portion 142 that is in contact with the cam surface 131A, the cam surface 131A and the side surface 142A of the conical portion 142 are stably fitted, and the lever 140 is not easily rotated even when an external force, such as impact or vibration, is applied to the lever 140. Thus, it is possible to prevent an erroneous rotation operation of the lever 140 from being detected when the knob 180 is not operated.

In addition, when the knob 180 is not operated, the lever 140 is urged upward by the coil spring 160, the spherical surface 141A is separated from the arched surface 112A of the support portion 112, and the conical portion 142 is fitted to and held by the cam surface 131A. When the knob 180 is operated, the conical portion 142 of the lever 140 is pressed down by the cam surface 131A, the spherical surface 141A is supported by the support portion 112, and the spherical surface 141A slides on the support portion 112 and rotates. As a result, when the knob 180 is operated, the lever 140 can be rotated in multiple directions while the distance between the rotation center 141B of the lever 140 and the magnetic sensor 150 remains unchanged. This eliminates variation of the detection result of the magnetic sensor even when the operation is performed repeatedly, and the rotation operation performed by the lever 140 can be accurately detected at all times.

In the above description, the lever 140 has the conical portion 142 on the upper end side, and the conical portion 142 is engaged with the cam surface 131A of the movable portion 130. However, the shape of the first end portion of the lever 140 that engages with the cam surface 131A is not limited to the conical portion 142. The first end portion may have any shape that can be engaged with the cam surface 131A when the operations illustrated in FIGS. 4A to 6 are performed.

In the above description, the knob 180 and the movable portion 130 are integrally slid in the same lateral direction. However, the operation performed by the knob 180 is not limited to lateral sliding. For example, the knob 180 may tilt, and the movable portion 130 may slide in accordance with the tilt.

In addition, the shape of the cam surface 131A is not limited to the shape illustrated in FIGS. 1 to 6. The shape may be any shape that can be engaged with the first end portion of the lever 140 when the operations illustrated in FIGS. 4A to 6 are performed.

In addition, in the above description, the base portion 141 of the lever 140 has the spherical surface 141A and is supported by the arched surface 112A of the frame 110. However, if the operations illustrated in FIGS. 4A to 6 can be performed, the shapes of the spherical surface 141A and the arched surface 112A are not limited to the shapes described above. For example, if the lever 140 is rotatable in only one specific direction, the shape of the base portion 141 of the lever need not be a spherical surface and can be a curved surface having a curvature that varies in the specific direction.

In addition, while the embodiment in which the lever 140 has four arm portions 141C has been described above, the number of the arm portions 141C and the structure of the arm portions 141C are not limited to the number of arm portions and the structure described above. For example, the lever 140 may have an annular protrusion that is in contact with the upper end of the coil spring 160 instead of the arm portion 141C. Such a protrusion is a protrusion that protrudes from the outer peripheral surface of the base portion 141 in the horizontal direction in an annular shape.

While the input device according to an exemplary embodiment of the present invention has been described above, the present invention is not limited to the specifically disclosed embodiment, and various changes and modifications can be made without departing from the scope of the claims.

What is claimed is:

1. An input device comprising:

an operating body configured to move through an operation performed by an operator;

a movable portion configured to slide in accordance with movement of the operating body;

a lever including a first end portion that engages with the movable portion, a rotation center, a second end portion located on an opposite side of the rotation center from the first end portion, and a magnet provided on the second end portion, wherein the lever rotates in accordance with sliding of the movable portion; and a magnetic sensor disposed facing the magnet, wherein a second length from the rotation center of the lever to the magnet is greater than a first length from the rotation center to the first end portion of the lever.

2. The input device according to claim 1, further comprising:

a support portion configured to rotatably support the lever, wherein the lever further includes a curved surface that is in contact with the support portion at least during rotation of the lever.

3. The input device according to claim 2, further comprising:

an elastic member configured to urge the lever toward the movable portion, wherein the movable portion includes an engagement portion that engages with the lever, and the engagement portion has a cam surface provided along an inner surface of an opening, and wherein the first end portion is urged toward the cam surface by the elastic member.

4. The input device according to claim 3, wherein the first end portion of the lever further includes a conical portion, and wherein a side surface of the conical portion is in contact with the cam surface.

5. The input device according to claim 4, wherein when the operating body is not operated, the lever is urged toward the movable portion by the elastic member, the curved surface is separated from the support portion, and the conical portion is fitted to and held by the cam surface of the movable portion, and wherein when the operating body is operated, the conical portion of the lever is pressed down by the cam surface, the curved surface is supported by the support portion, and the lever rotates due to sliding of the curved surface relative to the support portion.

* * * * *